US009970353B2

(12) United States Patent
Guethe et al.

(10) Patent No.: US 9,970,353 B2
(45) Date of Patent: May 15, 2018

(54) METHOD FOR OPERATING A GAS TURBINE AND GAS TURBINE FOR PERFORMING THE METHOD

(71) Applicant: Ansaldo Energia IP UK Limited, London (GB)

(72) Inventors: Felix Guethe, Basel (CH); Eribert Benz, Birmenstorf (CH); Frank Graf, Nussbaumen (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 783 days.

(21) Appl. No.: 14/489,595

(22) Filed: Sep. 18, 2014

(65) Prior Publication Data
US 2015/0000296 A1 Jan. 1, 2015

Related U.S. Application Data

(63) Continuation of application No. PCT/EP2013/055873, filed on Mar. 21, 2013.

(30) Foreign Application Priority Data

Mar. 21, 2012 (EP) .................................. 12160546

(51) Int. Cl.
*F01N 3/20* (2006.01)
*F02C 3/34* (2006.01)
(Continued)

(52) U.S. Cl.
CPC ............ *F02C 3/34* (2013.01); *B01D 53/8643* (2013.01); *F02C 6/18* (2013.01); *B01D 2255/707* (2013.01); *Y02E 20/16* (2013.01)

(58) Field of Classification Search
CPC ... F02C 3/34; F02C 6/18; Y02E 20/16; F01K 23/10; F23C 2202/00; F05D 2270/082; F01N 3/208; F01N 2610/02
See application file for complete search history.

(56) References Cited

U.S. PATENT DOCUMENTS 4,297,319 A    10/1981  Ishibashi et al.
5,078,973 A *  1/1992   Kuroda ............ B01D 53/8625
                                              422/108
(Continued)

FOREIGN PATENT DOCUMENTS

CH      699 804 A1    4/2010
CN     101424216 A    5/2009
(Continued)

OTHER PUBLICATIONS

F. Güthe et al., Flue Gas recirculation of the Alstom Sequential Gas Turbine Combustor Tested at High Pressure, Proc. ASME Turbo Expo 2011, Jun. 6-10, 2011, Vancouver, Canada, GT2011-45378.
(Continued)

*Primary Examiner* — William H Rodriguez
(74) *Attorney, Agent, or Firm* — Buchanan Ingersoll & Rooney PC

(57) ABSTRACT

In a method for operating a gas turbine, NOx is removed from the exhaust gases of the gas turbine by means of a selective catalysis device with the addition of NH3. The method achieves an extremely low NOx content while simultaneously achieving economic consumption of NH3 and avoiding NH3 in the exhaust gas by maintaining the NOx content of the exhaust gas at a constant level via a regulated return of a portion of the exhaust gas in varying operating conditions of the gas turbine, and by adjusting the addition of the NH3 in the selective catalysis device to the constant NOx level.

20 Claims, 1 Drawing Sheet

(51) Int. Cl.
*B01D 53/86* (2006.01)
*F02C 6/18* (2006.01)

(56) References Cited

U.S. PATENT DOCUMENTS

| | | | | |
|---|---|---|---|---|
| 6,003,306 | A * | 12/1999 | Kalversberg | F01N 3/0842 60/274 |
| 7,861,511 | B2 | 1/2011 | Chillar et al. | |
| 8,402,755 | B2 | 3/2013 | Sengar et al. | |
| 8,414,852 | B1 * | 4/2013 | Johnson | B01D 53/56 422/168 |
| 8,424,283 | B2 | 4/2013 | Chillar et al. | |
| 8,539,749 | B1 * | 9/2013 | Wichmann | F02C 3/34 60/39.52 |
| 2007/0034171 | A1 * | 2/2007 | Griffin | F01K 21/047 122/479.1 |
| 2008/0294329 | A1 | 11/2008 | Noda | |
| 2009/0107141 | A1 | 4/2009 | Chillar et al. | |
| 2009/0218821 | A1 * | 9/2009 | ElKady | F01K 23/10 290/52 |
| 2009/0284013 | A1 | 11/2009 | Anand et al. | |
| 2010/0024379 | A1 | 2/2010 | Sengar et al. | |
| 2011/0107736 | A1 | 5/2011 | Chillar et al. | |
| 2011/0154806 | A1 * | 6/2011 | Hoyte | F01N 3/208 60/276 |
| 2011/0289899 | A1 | 12/2011 | De La Cruz Garcia et al. | |
| 2011/0308389 | A1 * | 12/2011 | Graff | B01D 53/1406 95/166 |
| 2012/0036860 | A1 | 2/2012 | Wettstein et al. | |
| 2013/0119667 | A1 * | 5/2013 | Christensen | B01D 53/1475 290/52 |
| 2013/0205796 | A1 * | 8/2013 | Christensen | B01D 53/1418 60/772 |
| 2013/0269362 | A1 * | 10/2013 | Wichmann | F02C 3/34 60/773 |
| 2013/0305732 | A1 * | 11/2013 | Benz | B01F 3/02 60/772 |
| 2014/0202166 | A1 * | 7/2014 | Kagolanu | F02C 9/00 60/773 |
| 2014/0290264 | A1 * | 10/2014 | Hovel | F02C 9/16 60/772 |
| 2014/0360154 | A1 * | 12/2014 | Benz | F02C 3/34 60/39.52 |
| 2014/0360186 | A1 * | 12/2014 | Doering | F01N 3/2066 60/605.2 |
| 2015/0007579 | A1 * | 1/2015 | Curran | F01K 23/10 60/772 |
| 2015/0013300 | A1 * | 1/2015 | Axelbaum | F23L 7/007 60/39.15 |
| 2015/0089956 | A1 * | 4/2015 | Wang | F01D 25/30 60/783 |

FOREIGN PATENT DOCUMENTS

| | | |
|---|---|---|
| DE | 10 2008 002870 A1 | 12/2008 |
| DE | 10 2009 003481 A1 | 8/2009 |
| EP | 0 620 362 B1 | 10/1994 |
| EP | 2 390 483 A2 | 11/2011 |
| JP | S5479160 A | 6/1979 |
| JP | H08281061 A | 10/1996 |
| JP | 2010031869 A | 2/2010 |
| JP | 2011047384 A | 3/2011 |

OTHER PUBLICATIONS

Office Action dated Nov. 18, 2015, issued by the State Intellectual Property Office of the People's Republic of China in corresponding Chinese Patent Application No. 201380015561.2, with an English translation of the Office Action. (13 pages).

Office Action (Notification of Reasons for Refusal) dated Nov. 28, 2016, by the Japanese Patent Office in corresponding Japanese Patent Application No. 2015-500918, and an English Translation of the Office Action. (12 pages).

* cited by examiner

METHOD FOR OPERATING A GAS TURBINE AND GAS TURBINE FOR PERFORMING THE METHOD

CROSS-REFERENCE TO RELATED APPLICATIONS

This application claims priority to PCT/EP2013/055873 filed Mar. 21, 2013, which claims priority to European application 12160546.3 filed Mar. 21, 2012, both of which are hereby incorporated in their entireties.

TECHNICAL FIELD

The present invention relates to the field of gas turbines. It relates to a method for operating a gas turbine according to the preamble of claim 1. It further relates to a gas turbine for carrying out the method and to a combined-cycle power plant having a gas turbine.

BACKGROUND

In order to further increase the power and efficiency of gas turbines, the combustion temperatures are raised further. Higher combustion temperatures can lead to a higher content of undesirable NOx in the flue gas. Reducing the NOx content of the flue gas by means of improved combustion technology has, however, limits with respect to mixing, leakage and residency time of the fuel. Further reduction by means of combustion technology does not appear to be possible.

Attention must therefore be directed to how the NOx content of the flue gas can be reduced by methods implemented post-combustion.

It is known, from the article by F. Güthe et al. Flue Gas Recirculation of the Alstom Sequential Gas Turbine Combustor Tested at High Pressure", Proc. ASME Turbo Expo 2011, Jun. 6-10, 2011, Vancouver, Canada, GT2011-45379, (see FIG. 5 therein), that the NOx content of the flue gas from a gas turbine can be greatly influenced and/or reduced, under certain circumstances, by means of flue gas recirculation (FGR).

The publication US 2009/0284013 A1 discloses a method and a device in which the NOx content of the flue gas from a gas turbine of a combined-cycle power plant is reduced by, on one hand, achieving a reduction by flue gas recirculation and, on the other hand, arranging a dry 3-way catalytic converter in the flue gas stream to the waste heat steam generator. Although this type of catalytic converter avoids the use of NH3 and the associated problem of contaminating the flue gases with NH3 ("NH3 slipping"), it is however extremely expensive due to the catalyst material used.

SUMMARY

The invention therefore has the object of proposing a method for operating a gas turbine which works with the use of NH3 but which substantially avoids the associated problems.

A further object of the invention is to propose a gas turbine for carrying out the method.

These and other objects are achieved by means of all the features of claims 1 and 8.

In the method according to the invention, the NOx is removed from the flue gases of the gas turbine by means of a selective catalysis device with addition of $NH_3$, wherein the NOx content of the flue gases is kept at a constant level by a controlled recirculation of part of the flue gases during changing operating conditions of the gas turbine, and the addition of the $NH_3$ in the selective catalysis device is adjusted to the constant NOx level.

It is thus possible, even in changing operating conditions, to always provide for the selective catalysis exactly that quantity of NH3 which is necessary in order to remove the NOx.

One embodiment of the method according to the invention is characterized in that the NOx content of the flue gases coming from the gas turbine is at the same time reduced in the long term by the flue gas recirculation. The NOx can thereby be even more effectively removed or separated from the flue gas.

Another embodiment of the method according to the invention is characterized in that the flue gases are fed through a cooling device with a direct contact cooler before the selective catalytic reduction in the selective catalysis device. The associated scrubbing effect can improve the effectiveness of the NOx removal by 10-30%.

In particular, in order to optimize the scrubbing effect in this context, the pH and the addition of oxidants can be controlled in the cooling device.

The gas turbine according to the invention for carrying out the method according to the invention has, connected downstream, a selective catalysis device which operates using $NH_3$ for removing NOx from the flue gas of the gas turbine. It is characterized in that the gas turbine is equipped with a controlled flue gas recirculation system.

One embodiment of the gas turbine according to the invention is characterized in that the flue gas recirculation system is designed to return flue gas to the inlet of the gas turbine.

Another embodiment of the gas turbine according to the invention is characterized in that a cooling device having a direct contact cooler is arranged upstream of the selective catalysis device.

In particular, the cooling device is designed for scrubbing the flue gas.

Another embodiment of the gas turbine according to the invention is characterized in that a controller, which is connected to the flue gas recirculation system and controls the flue gas recirculation as a function of the NOx content of the flue gas, is provided.

Another embodiment of the gas turbine according to the invention is characterized in that the gas turbine is equipped with a sequential combustion system. Such a gas turbine is disclosed for example by EP 0 620 362 B1, such that this publication forms an integral part of the present description.

The invention also relates to a combined-cycle power plant having a gas turbine according to the invention.

BRIEF DESCRIPTION OF THE DRAWINGS

The invention will be explained in more detail below, with reference to exemplary embodiments in conjunction with the drawing, in which.

DETAILED DESCRIPTION

Figure 1:
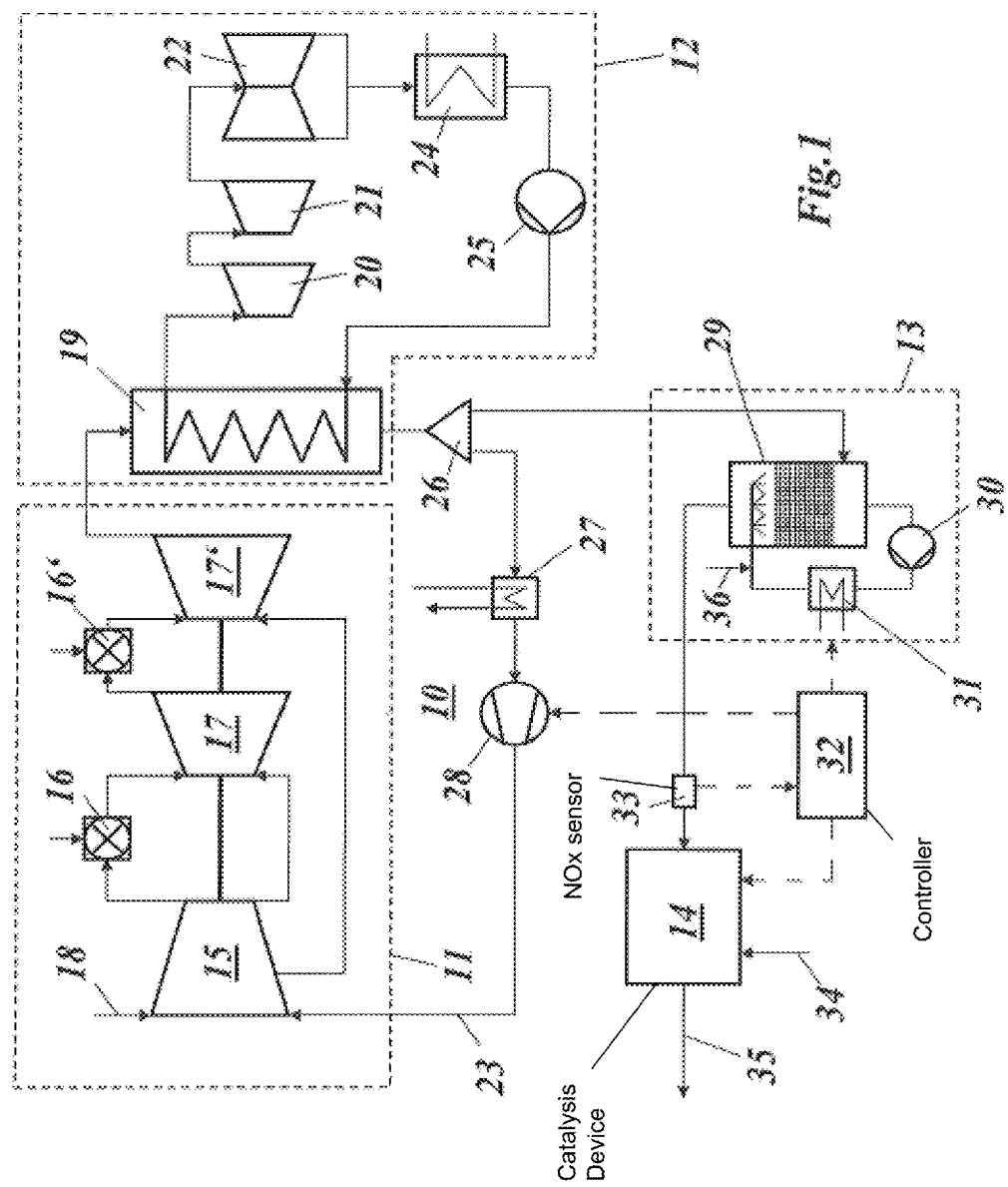
FIG. 1 shows, in a simplified plant layout, a combined-cycle power plant having a gas turbine according to one exemplary embodiment of the invention.

FIG. 1 shows, in a simplified plant layout, a combined-cycle power plant 10 having a gas turbine 11 according to one exemplary embodiment of the invention. The combined-cycle power plant 10 comprises, in addition to the gas turbine 11, a water/steam circuit 12 in which the flue gas from the gas turbine 11 flows through the waste heat steam generator 19 which, using the heat extracted from the flue gas, generates steam for a steam turbine arrangement with a high-pressure steam turbine 20, an intermediate-pressure steam turbine 21 and a low-pressure steam turbine 22. The steam leaving the low-pressure steam turbine 22 is condensed in a condenser 24. The resulting water is pumped back to the waste heat steam generator 19 by means of a pump 25 in the circuit.

After flowing through the waste heat steam generator 19, the flue gas is divided in a junction 26. One part is fed back, in a flue gas return line 23 via a cooler 27 and by means of a blower 28, to the inlet of the gas turbine 11 where, together with the ambient air 18 necessary for the combustion, it enters the compressor 15 of the gas turbine 11.

The other part of the flue gas enters, via a cooling device 13, a selective catalysis device 14 in which, by adding $NH_3$ (34), NOx is converted into $N_2$ and is thus removed from the flue gas. The resulting flue gas 35 can then be released into the atmosphere.

The cooling device 13 comprises a direct contact cooler (DCC) 29, wherein water, which circulates in a closed circuit and is pumped back to the direct contact cooler 29 through a heat exchanger 31 by means of a pump 30, is sprayed into the flue gas stream, thereby cooling the flue gas stream. As a consequence of the close contact between the sprayed water and the flue gas, it is simultaneously possible to generate a scrubbing effect which promotes the removal of the NOx. To that end, oxidants 36 such as NaOCl or $O_3$ or $H_2O_2$ may be added in a controlled manner to the water circuit. Furthermore, the pH in the circuit can be controlled.

After passing through the cooling device 13, the flue gas enters the selective catalysis device 14, where it is brought into intensive contact with ammonia 34.

The combination of flue gas recirculation (FGR) and selective catalytic reduction (SCR), wherein the flue gas recirculation is controlled such that a constant low NOx content in the flue gas is achieved even during changing operating conditions of the gas turbine 11, is essential to the invention. If such a constant low NOx content in the flue gas is maintained, it is possible on the one hand to save on $NH_3$ and on the other hand to precisely match the addition of $NH_3$ in the selective catalysis device 14 to the controlled value of the NOx content, such that contamination of the flue gases 35 with $NH_3$ is greatly reduced or entirely avoided. Thus, an extremely low NOx content in the flue gas 35 is achieved and the use of—and contamination with—NH3 are kept low.

A controller 32 is provided for carrying out the method and, on the one hand, controls the flue gas recirculation, e.g. by means of the blower 28, and, on the other hand, adjusts when necessary the addition of the $NH_3$ in the selective catalysis device 14. Furthermore, the scrubbing effect in the cooling device 13 can be controlled by the controller 32. Changes in the NOx content of the flue gas can be detected by a NOx sensor 33 which, for example, is arranged upstream of the inlet of the selective catalysis device 14 and transmits measurement values to the controller 32.

In relation to the NOx content, it is also advantageous if the gas turbine 11 is equipped with a sequential combustion system and comprises two combustion chambers 16 and 16' and two turbines 17 and 17'.

In all, the invention is distinguished by the following features and advantages:
- a combination of selective catalytic reduction (SCR) and flue gas recirculation (FGR) is used;
- the costly contamination of the flue gas with ammonia is reduced or avoided;
- the flue gas recirculation is controlled such that, even during different operating conditions of the gas turbine, a constant NOx content in the flue gas is maintained;
- the addition of ammonia for the selective catalytic reduction is matched to the NOx content of the flue gas, which is kept constant;
- in addition, the ratio of NO to $NO_2$ can be monitored in the context of the selective catalytic reduction;
- the scrubbing effect in the direct contact cooler 29 can increase the effectiveness of the NOx removal by 10-30%, depending on the $NO/NO_2$ ratio and operation of the direct contact cooler with respect to pH and addition of oxidant.

The arrangement shown in FIG. 1 also includes a variant in which the direct contact cooler (DCC) 29 is arranged upstream of the division of the flue gases such that it can process the entire flue gas mass flow.

The invention claimed is:

1. A method for operating a gas turbine, in which NOx is removed from the flue gases of the gas turbine by means of a selective catalysis device with addition of $NH_3$, the method comprising:
   keeping NOx content of the flue gases at a constant level by a controlled recirculation of part of the flue gases during changing operating conditions of the gas turbine by:
   detecting changes in the NOx content of the flue gas via at least one NOx sensor positioned upstream of the selective catalysis device;
   controlling a blower to control flue gas recirculation within the gas turbine; and
   adjusting the addition of the $NH_3$ in the selective catalysis device based on the detected changes in the NOx content of the flue gas to match the addition of $NH_3$ in the selective catalysis device to the constant level of the NOx content to keep the NOx content of the flue gas at the constant NOx level.

2. The method as claimed in claim 1, wherein the NOx content of the flue gases originating in the gas turbine and removed therefrom is at the same time reduced in the long term by the flue gas recirculation.

3. The method as claimed in claim 1, further comprising feeding the flue gases through a cooling device before the selective catalytic reduction in the selective catalysis device.

4. The method as claimed in claim 3, wherein the cooling device is operated with a direct contact cooler.

5. The method as claimed in claim 3, wherein the pH and the addition of additives and of oxidants is controlled in the cooling device.

6. The method as claimed in claim 5, wherein NaOCl and/or $O_3$ and/or $H_2O_2$ are used as the oxidants.

7. The method as claimed in claim 4, wherein the direct contact cooler is arranged upstream of a separation of the flue gases, and is operatively connected to the entire flue gas mass flow.

8. A gas turbine for carrying out the method of claim 1, the gas turbine having the selective catalysis device which operates using the $NH_3$ for removing NOx from the flue gas of the gas turbine, the gas turbine also comprising a controlled flue gas recirculation system and a controller, the controller communicatively connected to a blower of the controlled flue gas recirculation system to control flue gas recirculation and is also configured to control the adjusting of the addition of the $NH_3$ in the selective catalysis device.

9. The gas turbine as claimed in claim 8, wherein the flue gas recirculation system is designed to return flue gas to an inlet of the gas turbine.

10. The gas turbine as claimed in claim 8, further comprising a cooling device having a direct contact cooler that is arranged upstream of the selective catalysis device.

11. The gas turbine as claimed in claim 10, wherein the cooling device is designed for scrubbing the flue gas.

12. The gas turbine as claimed in claim 8, wherein the controller controls the flue gas recirculation as a function of the NOx content of the flue pas.

13. The gas turbine as claimed in claim 8, wherein the gas turbine is equipped with a sequential combustion system.

14. A combined-cycle power plant having a gas turbine as claimed in claim 8.

15. The method of claim 1, wherein the keeping of the NOx content of the flue gases at the constant level by the controlled recirculation of part of the flue gases during changing operating conditions of the gas turbine also comprises:
    separating the flue gas received from a heat steam generator of a water/steam circuit to direct part of the flue gas to a direct contact cooler;
    feeding oxidants into water that is fed into the direct contact cooler to cool and scrub the flue gas within the direct contact cooler; and
    directing the flue gas from the direct contact cooler to the selective catalysis device such that the detecting of the changes in the NOx content of the flue gas via the at least one NOx sensor positioned upstream of the selective catalysis device is performed prior to the flue gas from the direct contact cooler being fed into the selective catalysis device.

16. The method of claim 15, comprising:
    emitting flue gas out of the selective catalysis device so the flue gas is released to atmosphere external to the gas turbine.

17. The method of claim 15, wherein the controlling of the blower to control flue gas recirculation within the gas turbine is performed so that the part of the flue gas that is separated to direct part of the flue gas to the direct contact cooler is adjusted in response to the detected changes in the NOx content of the flue gas.

18. The method of claim 17, wherein the adjusting of the addition of the $NH_3$ in the selective catalysis device based on the detected changes in the NOx content of the flue gas to match the addition of $NH_3$ in the selective catalysis device to the constant level of the NOx content to keep the NOx content of the flue gas at the constant NOx level is controlled by a controller that also controls the blower.

19. The method of claim 18, comprising:
    the at least one NOx sensor communicating with the controller to transmit measurement values to the controller.

20. The method of claim 18, comprising:
    monitoring a ratio of NO to $NO_2$ in selective catalytic reduction occurring in the selective catalytic device.

* * * * *